Dec. 15, 1931.  A. V. ROWE  1,836,341
GARDEN TOOL
Filed Dec. 19, 1928   2 Sheets-Sheet 1
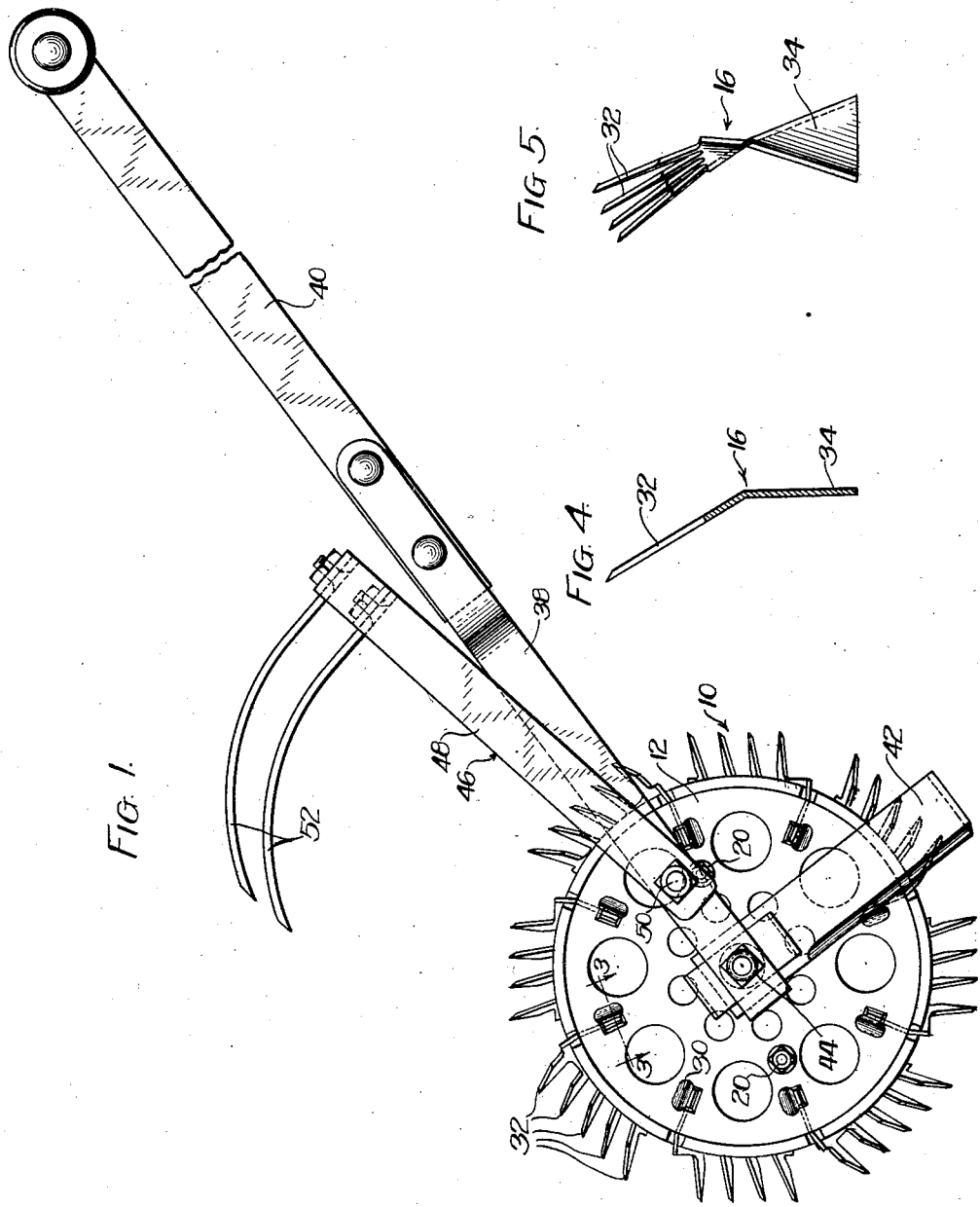
INVENTOR
ALVIN V. ROWE.
BY Cheever & Cox ATTYS.

Dec. 15, 1931.  A. V. ROWE  1,836,341
GARDEN TOOL
Filed Dec. 19, 1928   2 Sheets-Sheet 2
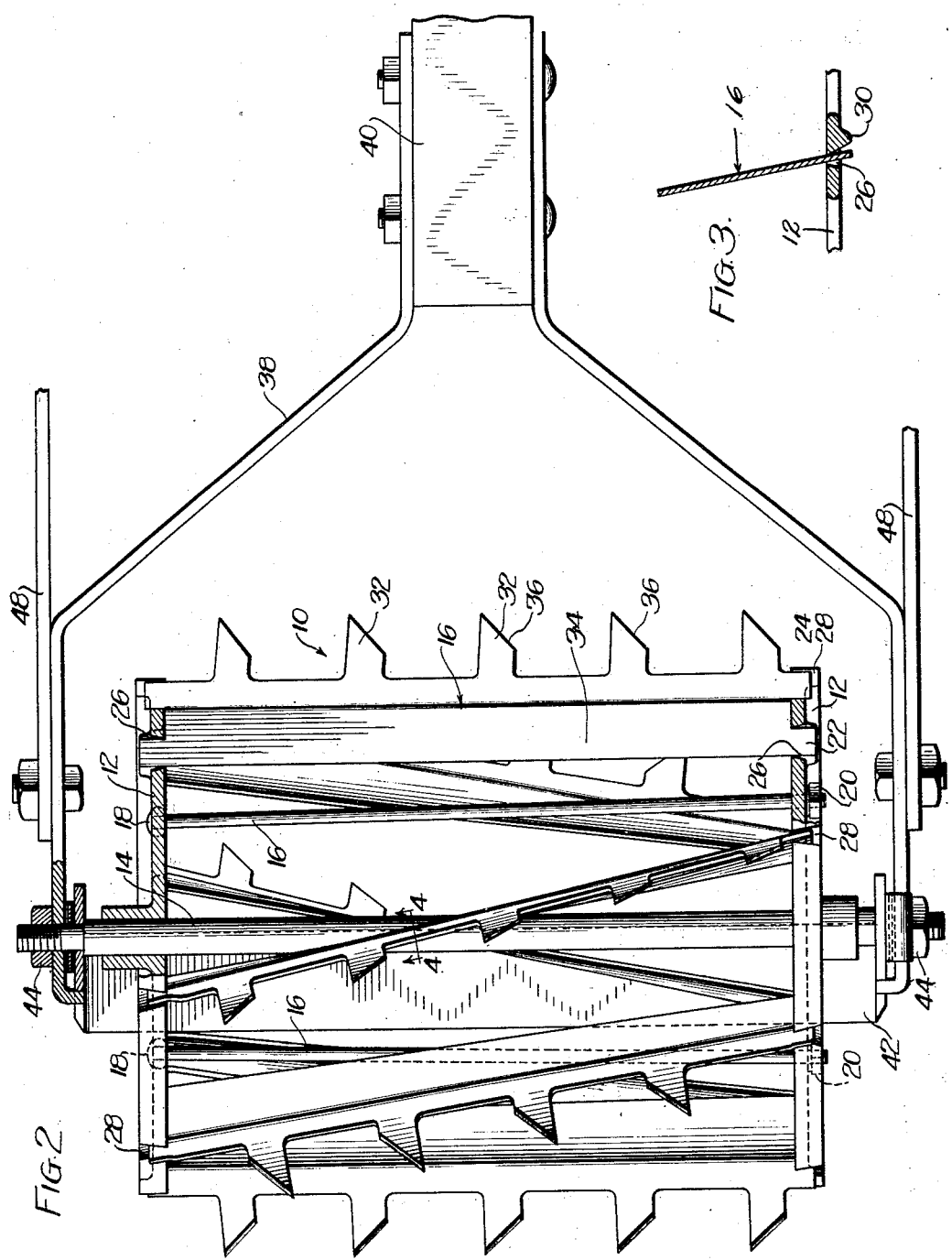
INVENTOR:
ALVIN V. ROWE
BY Cheever & Cox ATTYS.

Patented Dec. 15, 1931

1,836,341

UNITED STATES PATENT OFFICE

ALVIN V. ROWE, OF GALESBURG, ILLINOIS, ASSIGNOR TO ROWE MANUFACTURING COMPANY, OF GALESBURG, ILLINOIS, A CORPORATION OF ILLINOIS

GARDEN TOOL

Application filed December 19, 1928. Serial No. 326,949.

My invention relates to improvements in garden tools and particularly to garden tools of the rotary type for such purposes as cultivating, weeding and the like.

One of the primary objects of my present invention is to provide a rotary garden tool of improved, practical construction which will serve to effectively break up or hoe the surface soil when the same is caused to be moved across said surface.

More specifically, my invention contemplates a rotary garden tool including a plurality of soil engaging blades mounted within a rotary frame, the mounting of said blades being such as to render the same readily insertable and reversible within said frame.

Another object of my present invention is to provide a rotary garden tool of the above mentioned character in which the rotary blades are of unitary construction, and are provided with integral hoe points spaced along one margin of the blade, whereby when said blades are actuated, the hoe points will serve to effectively dig into and break up the surface soil.

Still another object of my invention is to arrange the soil engaging blades in such a manner that the hoe points thereof will be in staggered relation so that the individual hoe points of one blade will not be positioned exactly behind the hoe points in the adjacent blade, whereby the surface or crust soil may be effectively broken up.

In addition to the above mentioned advantageous characteristics, it is an object of my invention to provide a rotary garden tool of the above mentioned design in which the hoe points spaced along one margin of each of the blades are angularly disposed so that said hoe points enter the ground in a substantially vertical position and thus after entering the ground or soil will lift the surface portion or crust upwardly and thereby effectively break up the same.

These and other objects will be more apparent from the following detailed description when considered in connection with the accompanying drawings wherein:

Figure 1 discloses a side elevational view of a garden tool which represents one embodiment of my invention;

Figure 2 is an enlarged plan view of the rotary cutter portion of the device shown in Figure 1, certain portions of the frame being broken away for the purpose of more clearly disclosing the structural arrangement, said view being taken substantially along a line parallel with the operating handle;

Figure 3 is an enlarged detailed sectional view taken along the line 3—3 of Figure 1 to disclose the manner in which the blade are inserted within the side frame;

Figure 4 is an enlarged sectional view taken transversely of one of the blades substantially along the line 4—4 of Figure 2; and Figure 5 is an end view of one of the detached blades, said view clearly disclosing the arrangement of the hoe points or teeth along the margin of the blade.

Referring now to the drawings more in detail wherein I have employed like numerals to designate similar parts throughout the various figures, it will be observed that one embodiment of my invention comprises a rotary device or reel indicated generally by the numeral 10. This reel 10 includes a pair of spaced end sections or frames 12 which are rotatable upon a central shaft 14. The reel 10 also includes a plurality of blades 16 which extend between and are secured within the marginal portions of the frames 12. In order to secure the frames 12 in a fixed position when the blades 16 are properly interposed between said frames I provide a pair of tightening rods 16. One extremity of each of these rods is provided with a head 18 while the other extremity thereof is threaded to receive a tightening nut 20. Thus, when the blades and the frames are associated, these rods 16 may be inserted through apertures formed within one of the frames and then through similar apertures formed in the opposite frame so as to permit the threaded portion of said rods to project outwardly in position to receive the tightening nuts 20.

Referring now more specifically to the blades 16, it will be seen that each end thereof is provided with a pair of projecting sections 22 and 24 (Figure 2). The projecting section 22 is adapted to be received by an opening 26 provided within the frame 12 and the projecting section 24 is adapted to be received by a marginal opening 28 provided in said frame. These openings 26 and 28 may be conveniently formed within the frames 12 at the time said frames are molded and from the foregoing it will be apparent that outward displacement of the blades will be prevented by reason of the engagement of the projecting section 22 with the section of the frame extending between the openings 26 and 28. Referring to Figure 3 it will be seen I prefer to provide a lateral boss 30 adjacent each of the openings 26 in order to lend increased rigidity to the frame structure at the point and thereby provide a more effective mounting for the blades. It will thus be apparent that in order to mount the blades 16 within the end frames 12, it is only necessary to first insert the projecting sections 22 and 24 into their respective openings and then clamp the end frames together by means of the aforementioned tightening rods 16. It will be observed that by means of this construction the position of the blades within the reel may be reversed with little difficulty. That is to say, the blades may be positioned as shown in the drawings with prongs or hoe points 32 projecting outwardly or their position may be reversed so that said points will extend inwardly. When said points extend inwardly, a knife portion indicated by the numeral 34 will extend outwardly.

Attention is also directed to the fact that these prongs or hoe points 32 are positioned in staggered relation. That is to say, each of the individual points in one blade is circumferentially out of alignment with the individual prongs or points in the blade adjacent thereto. This construction is decidedly advantageous by reason of the fact that when the device is moved across the surface of the soil, said surface will be very efficiently broken up. In addition to the staggered arrangement of the prongs or teeth 32 it is to be noted that these prongs are positioned angularly with respect to the knife portion 34 of the blade as clearly shown in Figures 1, 4 and 5. This construction enables each tooth or hoe point to enter the ground in a substantially vertical position and thus cause the ground to be turned upwardly in response to the rotation of the reel. By churning or digging the surface soil in this manner, a decidedly beneficial and desirable result is obtained. It will also be noted that these hoe points 32 are formed with an angular edge 36 and the provision of this single edge enables the sharpening of the points by merely applying a sharpening tool to one surface.

The shaft 14 of the reel 10 carries a yoke 38 which is suitably secured to the lower extremity of an operating handle 40. This shaft also carries a U-shaped member or scuffle knife 42 which is adapted, when desired, to drag behind the reel 10 as shown in Figure 1. In order to secure the yoke 38 and the scuffle knife 42 in position upon the shaft I provide suitable tightening nuts 44. It will thus be apparent from the foregoing description that in the actual operation of the reel 10 it is only necessary to apply a pushing force to the outer end of the operating handle 40.

Pivotally mounted upon side portions of the yoke 38 is a cultivating device which I have indicated generally by the numeral 46. This device comprises a yoke 48 which is pivotally secured to the yoke 38 by means of bolts 50. The outer portion of the yoke 48 carries a plurality of cultivator blades 52 and it will be apparent that in order to employ these cultivator blades it is only necessary to swing the operating handle 40 to the left, Figure 1, so as to carry the said blades into operative association with the ground.

From the foregoing it will be observed that my invention provides a rotary garden tool or hoe which is very practical in design and equally efficient in operation. The manner in which the blades are mounted within the side frames permits the same to be readily assembled within said frames and likewise enables said blades to be conveniently reversed. In other words, when it is desirable to employ the hoe points, said blades may be positioned as shown in the drawings and when it is desirable to have the knife portions of the blades projecting outwardly, the position of said blades may be very easily reversed. By having the hoe points angularly disposed in the manner described, said points will enter the surface of the soil in a most efficient manner, that is to say, in a substantially vertical position. By this construction the desired ground breaking or churning effect will be produced regardless of the firmness of the surface crust. It will also be apparent that the hoe points are integral with the body portion of the blade and hence present very firm, rigid crust engaging elements. The openings in the side frames for receiving the projecting sections of the blades may be formed within said frames at the time they are molded and no machining operations are required. In other words, a clamping fit of the blade ends within said openings is not necessary because the clamping action of the tightening rods is sufficient to rigidly secure said blades in proper position. In the operation of the device the numerous hoe points which are sharpened on one side enter the soil as the reel is moved forward so as to pry underneath the surface crust and then break up said crust. The scuffle knife may or may not be used, depending upon the nature of the surface crust which is to be broken up.

When the device is used as a weeder, the scuffle knife may be employed to move along under the surface of the soil and cut off long weed roots, the same being torn to pieces by the revolving reel blades and the numerous hoe points.

Having thus described my invention, what I claim as new and desire to secure by Letters Patent is:—

1. In a tool of the class described, a reel comprising a frame and a plurality of soil engaging blades removably mounted within said frame, said blades being mounted within said frame in such a manner as to enable the position of the blades within the frame to be reversed, whereby either edge of said blades may occupy a soil engaging position.

2. In a tool of the class described, a reel comprising a pair of rotary end frames and a plurality of soil engaging blades detachably mounted along the margin of said side frames, the ends of said blades being so constructed as to permit the position of said blades within said frames to be reversed, whereby either of the work engaging edges of said blades may be presented to the soil.

3. In a tool of the class described, a reel comprising a pair of rotary end frames and and a plurality of soil engaging blades disposed between said frames, one edge of said blades being provided with spaced soil engaging prongs, the ends of said blades being removably mounted within said frames, so as to enable the position of said blades to be reversed, whereby either the soil engaging prongs or the opposite edge of said blades may be presented to the soil.

4. In a tool of the class described, a reel comprising a pair of rotary end frames and a plurality of soil engaging blades interposed therebetween, the opposite extremities of said blades being formed with projecting sections and the frames being provided with openings for receiving said sections, whereby the position of the blades within the frames may be reversed so as to present either edge of said blade in soil engaging position.

5. In a tool of the class described, a reel comprising a pair of rotary end frames and a plurality of soil engaging blades interposed between the marginal portions of said end frames, the opposite extremities of said blades being provided with a pair of projecting sections, said frame being provided with a pair of spaced apertures for receiving said projecting sections, whereby said blades may be secured against outward displacement and are rendered reversible within the frames.

6. In a tool of the class described, a reel comprising a pair of rotary end frames and a plurality of soil engaging blades interposed between the marginal portions of said end frames, the opposite extremities of said blades being provided with a pair of projecting sections, said frame being provided with a pair of spaced apertures for receiving said projecting sections, whereby said blades may be secured against outward displacement and are rendered reversible within the frames, and means for clamping said end frames to rigidly secure the blades in operative position.

7. In a tool of the class described, a reel comprising a pair of rotary end frames and a plurality of soil engaging blades interposed between the marginal portions of said end frames, the opposite extremities of said blades being provided with a pair of projecting sections, said frames being provided with a pair of spaced apertures for receiving said projecting sections, whereby said blades may be secured against outward displacement and are rendered reversible within the frames, and tightening rods extending from one frame to the other whereby said frames may be urged toward each other and thereby secure the blades in operative position.

8. In a tool of the class described, a reel comprising a pair of end frames and a plurality of soil engaging blades disposed therebetween, said blades being removably mounted within the frames and having a plurality of hoe points formed along one edge thereof, one of the lateral edges of said hoe points being in a plane substantially perpendicular to the axis of rotation of the reel and another edge of said hoe points lying in a plane angularly disposed with respect to said first mentioned plane, whereby a single sharpening edge for said hoe points is presented.

9. In a tool of the class described, a reel comprising a pair of rotary end frames and a plurality of soil engaging flat type blades interposed therebetween, the opposite extremities of said blades having spaced projecting sections, said frames being provided with recesses for receiving said spaced projections.

10. In a tool of the class described, a reel comprising a pair of rotary end frames, and a plurality of soil engaging blades comprised of flat stock interposed therebetween, the opposite extremities of said blades having projecting sections, said frames being provided with openings for receiving said projecting sections, whereby said blades may be securely held in position within the frames.

11. In a tool of the class described, a reel comprising a pair of rotary end frames, said frames being provided with a plurality of spaced recesses adjacent the periphery of said frames and a plurality of companion recesses spaced inwardly from said first mentioned recesses, and a plurality of soil engaging blades interposed between said frames, the opposite extremities of said blades having projecting sections adapted to be received by the companion recesses in said frames.

12. In a rotary garden tool of the class described, a reel comprising a pair of rotary end frames, said frames being provided with a plurality of radial recesses spaced along the periphery thereof and a plurality of radial recesses companion to said first mentioned recesses and positioned inwardly therefrom, and a plurality of soil engaging blades, the opposite extremities of said blades being provided with projecting sections adapted to be received by said companion radial recesses, whereby said blades may be effectively locked in position between said end frames.

13. In a garden tool of the class described which is adapted to be manually urged across the surface of the soil, a rotary cultivator mechanism including rotary side frames and a plurality of blades extending between said frames and comprising spaced prongs extending outwardly beyond the periphery of said side frames, said prongs being so disposed as to enter the soil and thereby positively penetrate and agitate the soil when said mechanism is manually urged across the surface thereof, an operating handle connected with said rotary mechanism which is adapted to be manually gripped at its outer end for urging said mechanism across the soil, and a scuffle knife positioned adjacent said prongs and adapted to enter the soil immediately after said prongs have operatively engaged said soil, whereby to effectively complete the breaking up thereof.

14. In a garden tool of the class described which is adapted to be manually urged across the surface of the soil, a rotary cultivator mechanism including rotary side frames and a plurality of blades extending between said frames and comprising spaced prongs extending outwardly beyond the periphery of said side frames, said prongs being so disposed as to enter the soil and thereby positively penetrate and agitate the soil when said mechanism is manually urged across the surface thereof, said prongs being arranged in staggered relation whereby to effectively break up all of the soil superimposed by the rotary mechanism, an operating handle connected with said rotary mechanism which is adapted to be manually gripped at its outer end for urging said mechanism across the soil, and a scuffle knife positioned adjacent said prongs and adapted to enter the soil immediately after said prongs have operatively engaged said soil, whereby to effectively complete the breaking up thereof.

In witness whereof, I have hereunto subscribed my name.

ALVIN V. ROWE.